United States Patent [19]

Amjadi

[11] 4,188,831
[45] Feb. 19, 1980

[54] AUTOMATIC TRANSMISSION

[76] Inventor: Ahmad Amjadi, P.O. Box 3406, Tehran, Iran

[21] Appl. No.: 910,275

[22] Filed: May 30, 1978

[51] Int. Cl.² ............................................ F16H 37/12
[52] U.S. Cl. ...................................................... 74/52
[58] Field of Search .................. 74/52, 36, 116, 118, 74/125.5

[56] References Cited

U.S. PATENT DOCUMENTS

| | | |
|---|---|---|
| 3,608,391 | 9/1971 | Bargstedt et al. ............... 74/52 X |
| 3,805,627 | 4/1974 | Burton et al. ..................... 74/52 |
| 4,020,708 | 5/1977 | Obra .................................. 74/52 |
| 4,047,441 | 9/1977 | Kellogg ............................. 74/52 |
| 4,089,228 | 5/1978 | Obra .................................. 74/52 |

*Primary Examiner*—Lance Chandler
*Attorney, Agent, or Firm*—Learman & McCulloch

[57] ABSTRACT

An automatic transmission is provided in which the torque from the motor is converted and coupled to the load via n (typically n=3) intermediate mechanisms, each delivering power to the load with a constant phase difference of $\phi = 360°/n$ between successive deliveries. Three different intermediate mechanisms consisting of springs, springs and a crankshaft, and levers with variable lever arms are provided. These systems have no frictional or hydraulic or other dissipative clutch mechanisms, and are regenerative in that power not delivered to the load goes back to the motor. Also, there are no discrete gears, and as the torque required by the load varies, the torque conversion is accomplished automatically and continuously as if an infinite number of gears were provided. The system also has infinite gear ratio capability in reverse as well as in forward direction.

6 Claims, 6 Drawing Figures

1

AUTOMATIC TRANSMISSION

BACKGROUND OF THE INVENTION

1. Field of the Invention

This invention relates generally to automatic transmissions, and, more particularly, is directed toward a new and improved way of changing torque ratios continuously and regeneratively to ensure smooth and economical operation of the transmission.

2. Description of the Prior Art

There is a very large number of patented automatic transmission systems. Many such systems involve some form of hydraulic coupling to the motor, frictional or hydraulic clutches, and discrete (regular or planetary) gearing with hydraulic torque converters. In these systems discrete gear changes reduce the smoothness of operation and can sometimes create loads on the motor different from the optimum. Power dissipation in these transmissions also wastes power and sometimes even requires means for cooling the transmission.

Efforts in the direction of continuous, infinite gear ratio transmission have usually involved some form of frictional or hydraulic arrangements, therefore, adding to the power dissipation in the transmission.

A regenerative system with energy storage in a flywheel has been proposed, but it has mechanical complexities and difficulties in retrieving energy from the flywheel.

SUMMARY OF THE INVENTION

It is the object of this invention to provide an automatic transmission which has no clutches which connect the motor with the load. Another object of this invention is to introduce a novel system of changing torque ratios in a continuous manner, such that the load can receive the required torque at high or low speeds and yet the motor can work at a constant speed and experience optimum load at all times. Another object of this invention is to accomplish the above and yet maintain simplicity of the construction for mass production. It is a further object of this invention to have a minimum power consumption and be economical. Another object is to provide a simple automatic transmission which can function for small systems such as bicycles and motorcycles as well as larger machines such as automobiles and cranes, and in general to be applicable to any system in which a mechanical, combustion, or electric motor supplies power to a variable load. Further advantages of this invention will become apparent from the following detailed description.

DESCRIPTION OF THE PREFERRED EMBODIMENT

Figure 1:
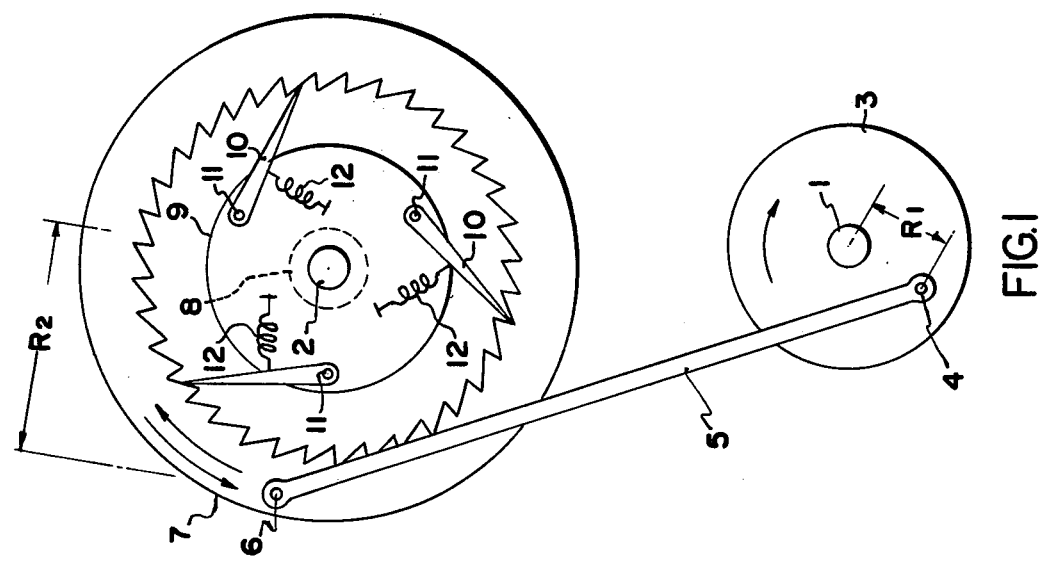
FIG. 1 is a front view showing the principle of the operation of the transmission based on lever arms.

The principle of operation of this invention is shown in FIG. 1. Shaft 1 is the driving shaft, and shaft 2 is connected to the load and driven by 1. Wheel 3 is rigidly mounted on shaft 1 and turns with it. Pin 4 is at distance $R_1$ from the center of wheel 3. Lever 5 is pivoted at 4 and also pivoted at pin 6, which is mounted on the front face of internal sawtoothed gear 7 at radius $R_2$. Internal gear 7 is concentrically mounted on shaft 2 via bearings 8 and can rotate on shaft 2 but separately from it. Disk 9 is rigidly mounted on load shaft 2, for example, keyed or bolted, and turns with 2. The motion of 7 is transferred to load shaft 2 via a one-way clutch. One example of such a clutch is used here. There are three one-way directional pins 10 mounted on disk 9, which are pivoted at one end about three equally spaced pins 11 on disk 9. There are also three small springs 12, which are lightly under compression and press the one-way directional pins 10 outward. The sawteeth on the inside of the internal gear 7 are such that in one direction of the rotation of 7 (counter-clockwise in FIG. 1) the pins 10 will be caught and thus will couple the rotation of 7 to load shaft 2 via disk 9. In the opposite direction the angle of the sawtooth in 7 with respect to the pins 10 is such that the pins 10 will rotate and lightly compress the springs 12, and no coupling of 7 and 2 will result. By proper arrangement of the sawtooth spacing and one-way pins 10 these pins will fall in the notches one after another and not simultaneously. This will reduce the backlash of the coupling in the switching of the direction of 7 in its alternating and oscillating motion. Rotation of the motor shaft 1 causes an alternating and oscillating motion of lever 5. This motion transmits an alternating partial rotation of 7 in both directions, which through the one-way clutch (pins 10 on the internal gear of 7) imparts partial rotational motion to 9 in a step-like fashion only in one direction (counter-clockwise in FIG. 1). We will see later how this chopped, ratchet-like motion can be smoothed.

The torque of the motor applies a force to lever 5. The magnitude of this force is inversely proportional to $R_1$. Therefore, for any given torque of the motor, if one varies $R_1$, at small $R_1$ a large force and at large $R_1$ a smaller force is transmitted to lever 5. If variation of $R_1$ is accomplished manually, this would result in a manual transmission with an infinite number of gears. $R_1$ can also be changed by a centrifugal mechanism or by fluid pressure, thus producing an automatic transmission. If, as mentioned above, $R_1$ is varied and $R_2$ is held constant, then the motor will experience a variable torque, and the load will experience a constant torque for a given force F on the lever. The reverse of this process where $R_1$ is held constant, and $R_2$ is varied by centrifugal means will also result in torque conversion. Here the motor at a given speed can maintain a fixed power output, feel a constant torque, apply a constant force to the load, and yet, torque conversion is achieved through variations in $R_2$ which are accomplished by a centrifugally moving weight on pin 6.

The ratio of the torque of the motor $T_1$ to the torque applied to the load $T_2$ is related to $R_1$, $R_2$ and the angular frequencies of the motor $W_L$ and the load $W_2$ are related as $T_1/T_2$ is proportional to $W_2/W_1$ and
$T_1/T_2$ is proportional to $R_1/R_2$ for a given motor speed. Therefore, depending on the need whether for a given motor speed the motor or the load is to maintain a fixed torque, one can incorporate the centrifugal weight on pin 6 (to vary $R_2$) or on pin 4 (to vary $R_1$) respectively.

Figure 2:
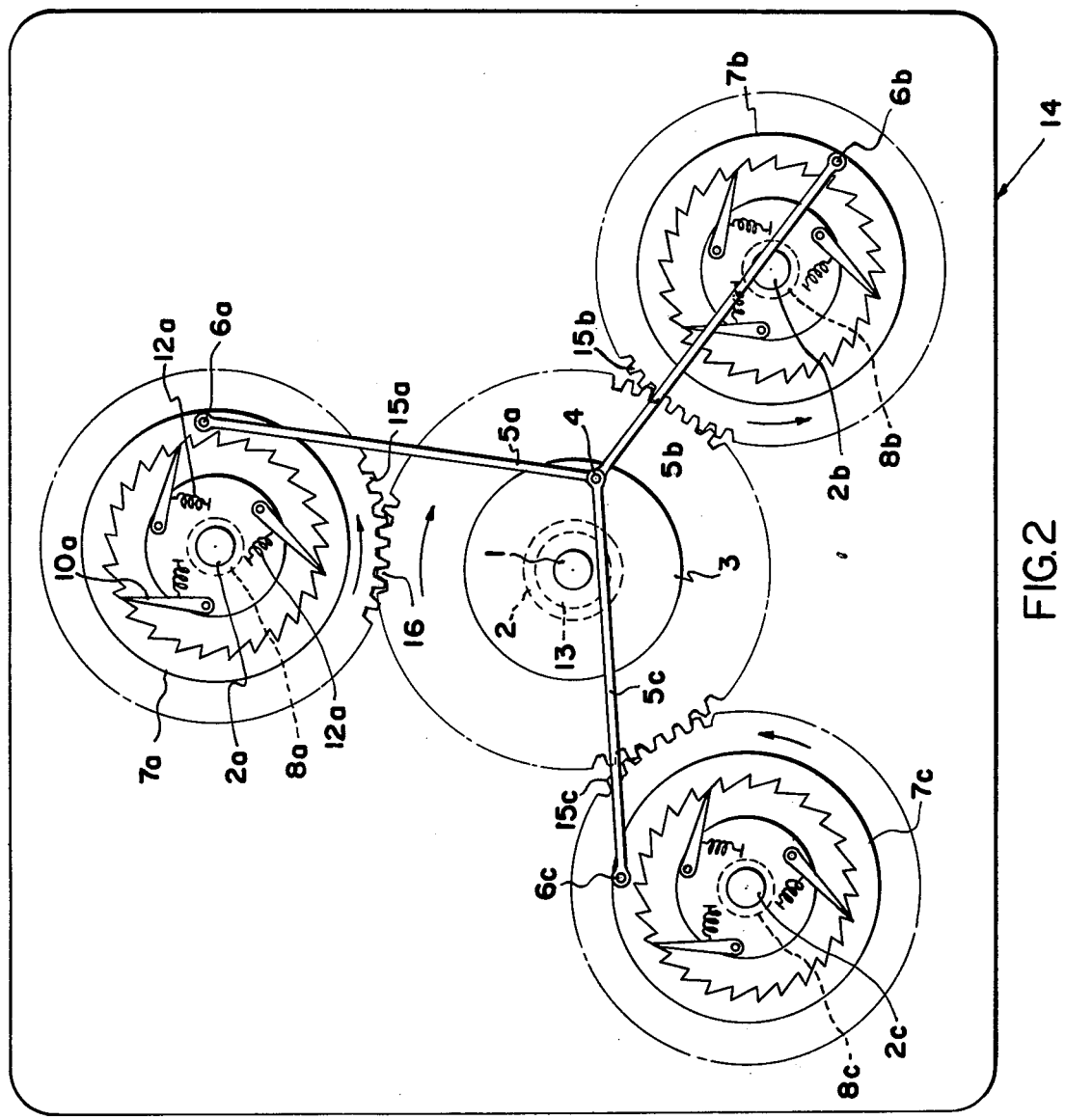
FIG. 2 is a front view of a three-phase transmission using the principle of the lever arms.

In order to smooth the step-like, ratchet types motion of the load, I have modified the design in FIG. 1 such that instead of only one secondary stage (including the lever, one-way clutch, and disk 9) there are n secondary stages, each moving in a ratchet type of motion. The system is designed such that each secondary stage rotates the load such that $360°/n$ phase difference exists between delivery of power to the load from successive secondary stages. In principle n can be any number, but in analogy to 3-phase motors, we can expect n=3 (and phase difference $\phi = 360°/3 = 120°$) will yield sufficient smoothness of operation and will still be economical. FIG. 2 shows how three secondary stages are placed around the driving shaft 1. Here the driven shaft 2 is coaxial with 1 but rotates on bearings 13 about 1 and separately from it. Three secondary intermediate shafts 2a, 2b, and 2c are placed in bearings 8a, 8b, and 8c in plate 14 and are rotated by the internal gears 7a, 7b, and 7c respectively through one-way clutches (pins 10a, spring 12a, etc.) similar to that of FIG. 1, shown here in a sectional view only. The spur gears 15a, 15b, and 15c are meshed to a central spur gear 16 which is rigidly mounted on load shaft 2 and rotates with it. One cycle of clockwise rotation of disk 3 with motor shaft 1 causes the partial rotation in counter-clockwise direction of 15a, 15b, and 15c in sequence. These gears are rigidly attached to the secondary driven shafts 2a, 2b, and 2c respectively. The resulting rotation of these gears in counterclockwise direction causes the spur gear 16 and the load shaft 2 to turn clockwise in a semi-continuous way. Here the lever arms 5a, 5b, and 5c are of the same length, and if a centrifugal weight is mounted on a radially movable pin 4, then we will have automatic torque conversion by varying $R_1$.

Figure 3:
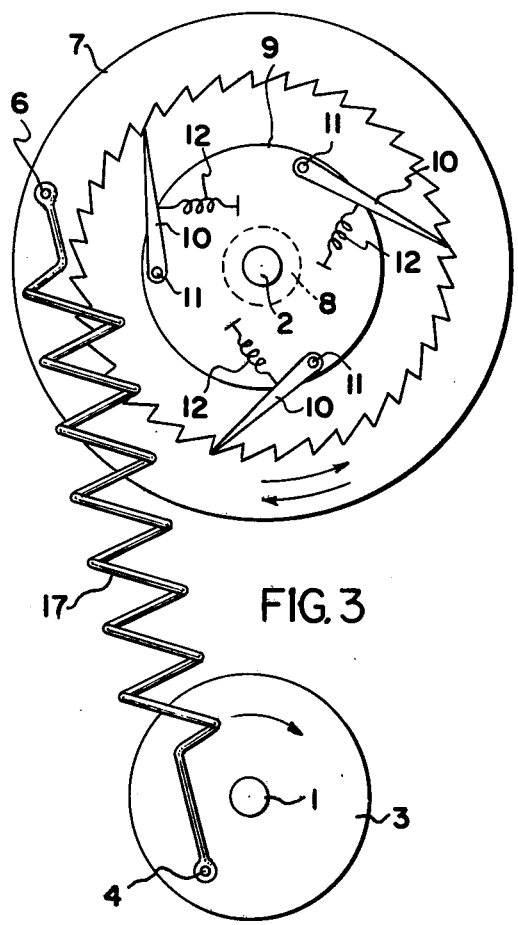
FIG. 3 is a front view showing the principle of the operation of the invention based on the use of springs.
Figure 4:
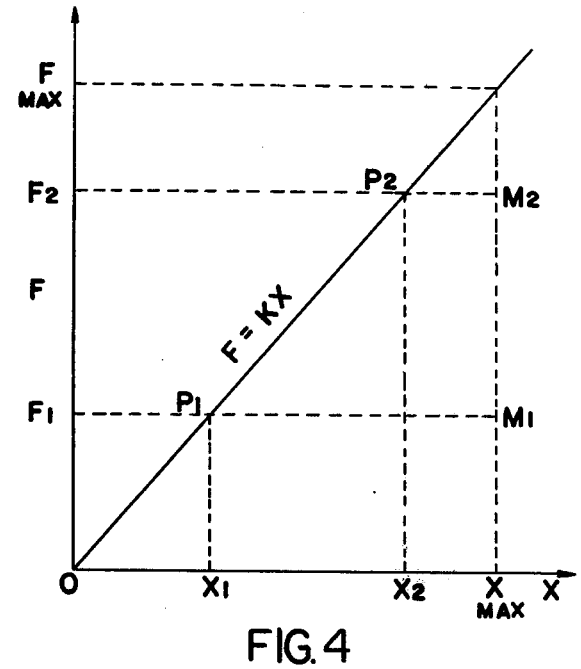
FIG. 4 is a graph showing the force vs. displacement to show the role of the spring in the transmission as an auto motor.

The principles discussed above can be incorporated in a similar design which uses springs instead of lever arms. In this invention the torque conversion is achieved through the use of springs, and therefore, no centrifugal system or lever arms are required. FIG. 3 shows a system identical to FIG. 1, except that here the lever arm 5 has been replaced by spring 17 with force constant K. i.e. $F = -Kx$ where F is the force in the spring, and x is the displacement of the spring from its equilibrium length. Clockwise rotation of 3 will compress and stretch the spring and apply a force to the internal gear 7 and cause an oscillating partial rotation of it in both directions. This motion is transferred to disk 9 through the one-way clutch system such that it only rotates counter-clockwise in a step-like ratchet type motion. If the load requires a large force to move, then on the stretching of the spring which turns 7 counterclockwise, little displacement of 6 will result as the spring builds up a larger force. When the spring 17 is sufficiently stretched to produce the necessary force for moving the load, then pin 6 will move. Since the total distance that pin 4 travels is set by $R_1$, then in this case in each turn during most of the time that 3 rotates, it will be either turning 7 in the decoupled direction or stretching 17. Only for a small fraction of the turn it will do work on the load. The situation is clarified in the force versus displacement diagram of the spring shown in FIG. 4. At the start the load requires a large torque corresponding to a large force $F_2$ in the spring 17 to move the load. FIG. 4 shows the stretching part of each cycle which turns 7 counterclockwise. As the force builds up, no motion of the load occurs until $P_2$ with force $F_2$ is reached at displacement $X_2$. After this point the spring will not stretch further and will maintain $F_2$ while the other end of the spring (pin 6) will move an amount corresponding to $(X_{max}-X_2)$ where $X_{max}$ is the maximum that 17 would stretch it the load could not move at all. Therefore, in the above instance the spring would have an amount of energy equal to $$W_s = \int_o^{x_2} F dx = \frac{1}{2} K x \frac{2}{2}$$

stored in it while it delivered an amount of energy equal to $$W_L = \int_{x_2}^{x_{max}} F_2 dx = F_2(X_{max} - X_2)$$

to the load in that cycle. $W_L$ is the area under the curve in the rectangle $P_2M_2X_2X_{max}$ while $W_s$ is the area of the triangle $OP_2X_2$ in FIG. 4. When the load has acquired momentum and requires less force, say $F_1$, to keep moving, then the spring quickly reaches $P_1$ when it has force $F_1$ and moves the load with an amount of energy $W'_s = \frac{1}{2}Kx2/1$ stored in it while it delivers $W'_L = F_1(X_{max}-X_1)$ to the load in each cycle. Here the displacement of the load $(X_{max}-X_1)$ in that cycle is larger, but it has been with less force than before. Therefore, torque conversion is automatic.

If the load could not be moved even with the spring 17 fully stretched to $X_{max}$, then the speed of the motor has to be increased such that the entire force $F_{max}$ is applied to the load more often in every second until the resulting impulses ($F \cdot \Delta t$; t=time) can change the momentum of the load. It must be noted that the stored energy in the spring goes back to the motor in the remaining part of the cycle, and there is no appreciable dissipation of power.

Figure 5:
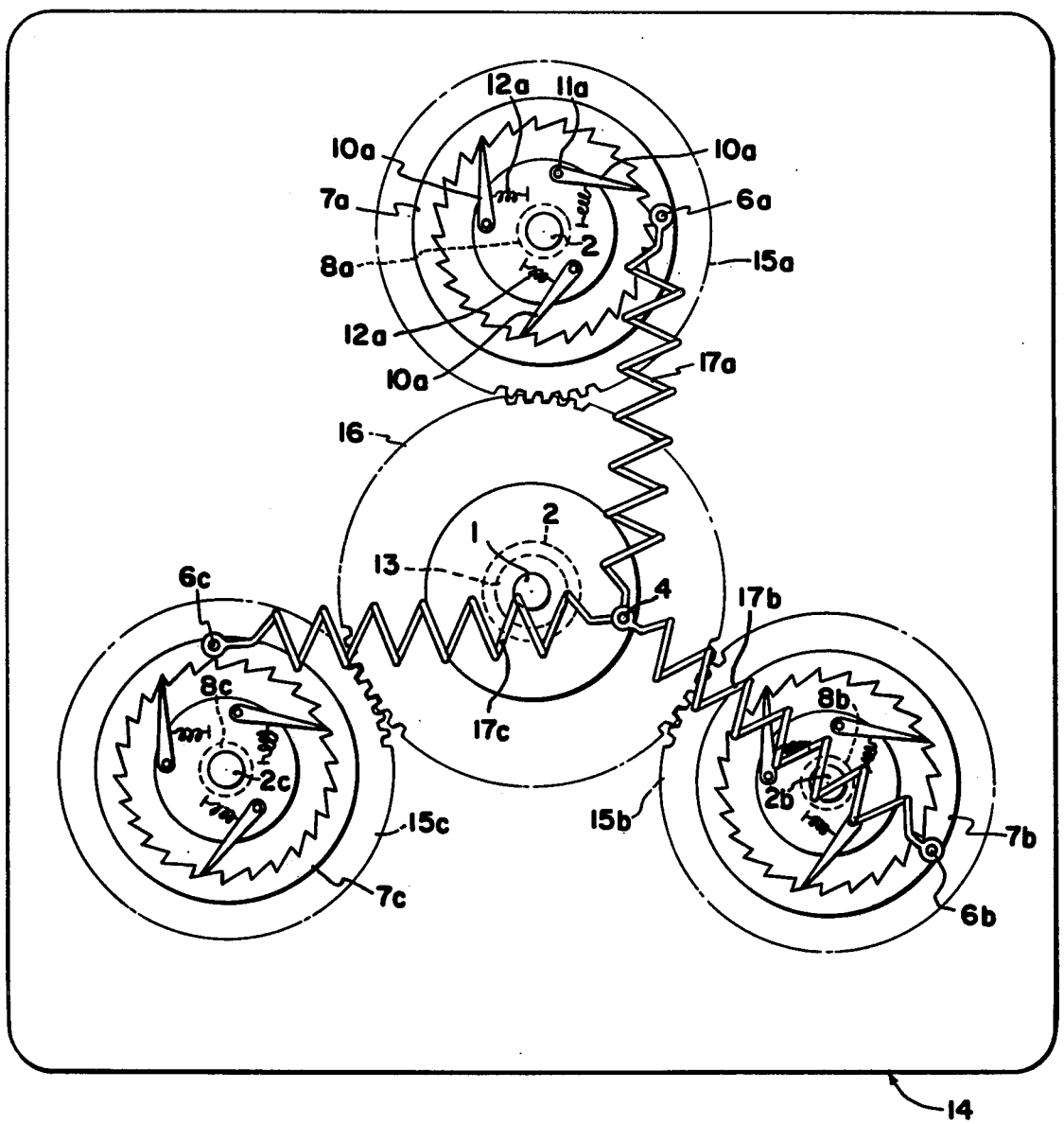
FIG. 5 is the front view of a three-phase transmission based on the use of springs.

FIG. 5 shows a system similar to that shown in FIG. 2, except that here the lever arms 5a, 5b, and 5c have been replaced by springs 17a, 17b, and 17c, and no provision for centrifugal changes in $R_1$ or $R_2$ ($R_{2a}$, $R_{2b}$, $R_{2c}$) is necessary to achieve fully automatic torque conversion and power transmission.

Figure 6:
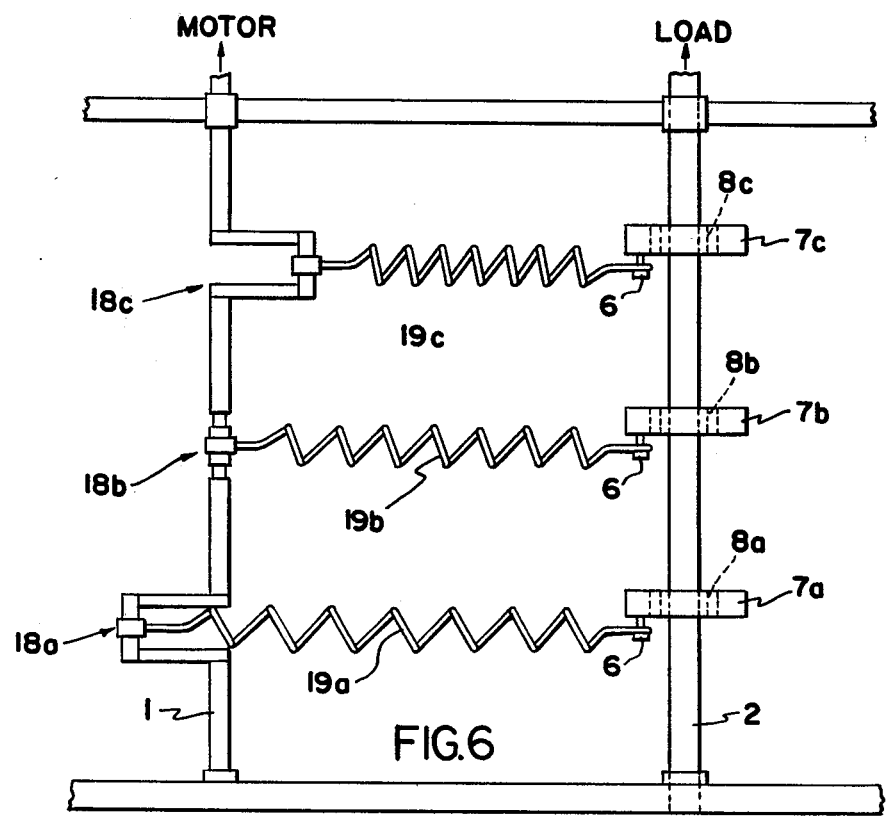
FIG. 6 is a top view of an alternative way of using springs in the automatic transmission.

I have also devised a system involving springs similar to that shown in FIG. 5, but one which allows for utilization of more powerful springs. This variation is useful in machinery which require large forces such as automobiles and cranes, but certainly not limited to such systems. In FIG. 6 the motor shaft 1 is connected to an n-crank (here again n=3) crankshaft such that the cranks 18a, 18b, and 18c are equally spaced along the length of 1 and placed $360°/n=120°$ from each other about its central axis. Three springs 19a, 19b, and 19c are pivoted on the above-mentioned cranks, and their other ends are pivoted on pins 6 (on three separate internal gears 7a, 7b, and 7c). The difference between this mechanism and that shown in FIG. 5 is that here the crankshaft 1 and loadshaft 2 are in parallel. Also the three secondary stages (7a, 7b, 7c, one-way clutches, etc.) are placed along loadshaft 2 on bearings 8a, 8b, and 8c. The phase of their operation is determined by the spatial location of the cranks 19a, 19b, and 19c. By separating the shafts 1 and 2 any desired length or shape of springs 19 can be accomodated for the desired application.

Again, this system is also fully automatic in transmission and torque conversion and is non-dissipative (regenerative).

For all three systems described above, whenever the application of the transmission requires a reverse gear such as in automobiles, the change to reverse is simple. By switching the direction of the one-way clutches, the direction of the motion of the load will reverse without the necessity of reversing the rotation of the motor. In the reverse the above systems will have the same infinite gear ratio capability as in forward where the torque conversion ratio changes continuously depending on the requirements of the load.

What is claimed is:

1. In an automatic transmission having a drive shaft and a driven output shaft mounted for rotation about an axis parallel to that of the axis of the drive shaft, and transmission means for transmitting rotation of said drive shaft to said driven shaft; the improvement wherein said transmission means comprises an elongate coupling means mounted at one end on said drive shaft for pivotal movement relative to said drive shaft about a first axis parallel to and radially offset from the axis of rotation of said drive shaft, disk means mounted upon said driven shaft for free coaxial rotation about the axis of said driven shaft, pivot means coupling the other end of said coupling means to said disk means for pivotal movement relative to said disk means about a second axis parallel to and radially offset from the axis of rotation of said driven shaft, said coupling means being operable upon rotation of said drive shaft to drive said disk means in oscillating rotary motion about the axis of said driven shaft, and one way clutch means coupling said disk means to said driven shaft to drive said driven shaft in step by step unidirectional rotation upon rotation of said drive shaft.

2. The invention defined in claim 1 wherein said drive shaft comprises a crank shaft having a number n of cranks equally offset from and symetrically disposed above the axis of said crank shaft, said driven shaft being mounted for rotation about an axis located in spaced parallel relationship to said axis of said crank shaft, an equal number n of disk means and associated one way clutch means mounted upon said driven shaft, and said coupling means comprising an equal number n springs, each spring being coupled at one end to one of said cranks and coupled at its opposite end to an associated disk means.

3. In an automatic transmission having a drive shaft and a driven output shaft mounted for independent rotation about coaxial shaft axes, and transmission means for transmitting rotation from said drive shaft to said driven shaft; the improvement wherein said transmission means comprises a number n of elongate coupling means respectively coupled at one end to said drive shaft at n locations symetrically spaced about the axis of said drive shaft for pivotal movement about respective pivot axes parallel to the shaft axes, an equal number n of disk means respectively mounted for free rotation on an equal number n intermediate shafts, said intermediate shafts being rotatable about respective axes parallel to and symetrically located about the axis of said driven shaft, pivot means pivotally connecting the other ends of said coupling means respectively to said disk means for pivotal movement about the shaft axes, spur gear means respectively fixed to said driven shaft and to each of said intermediate shafts and meshed with each other, and one way clutch means respectively coupling each of said disk means to the intermediate shaft upon which the disk means is mounted.

4. The invention defined in claim 3 wherein each of said coupling means comprises a spring.

5. The invention defined in claim 3 wherein each of said coupling means comprises a rigid link.

6. The invention defined in claim 5 comprising means for varying the radial distance from the axis of the shaft to the point at which said coupling means is coupled thereto.

* * * * *